UNITED STATES PATENT OFFICE.

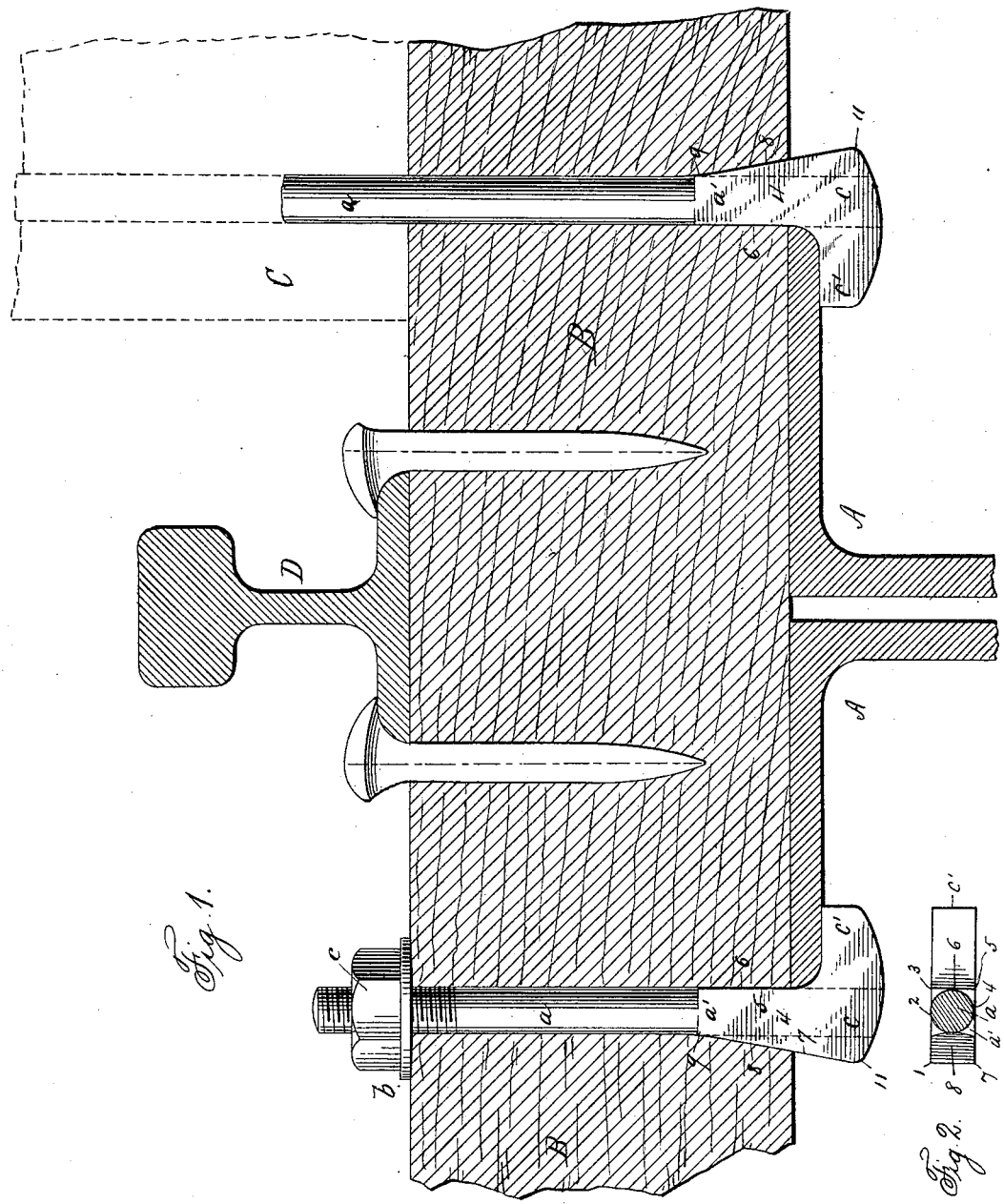

ABRAM J. HARDENBERGH, OF BROOKLYN, NEW YORK.

BOLT.

SPECIFICATION forming part of Letters Patent No. 366,394, dated July 12, 1887.

Application filed March 31, 1887. Serial No. 233,228. (No model.)

*To all whom it may concern:*

Be it known that I, ABRAM J. HARDENBERGH, of the city of Brooklyn, county of Kings, and State of New York, have invented a new and useful Improvement in Wedge-Back Compression-Bolts; and the following is declared to be a description of the same.

In railroad structures such as elevated roads and trestle-work long bolts are employed to hold the parts together, especially the cross-ties to the main girders and the guard-rails to the cross-ties and main girders, so as to bind the parts firmly together, and it occasionally becomes necessary to tighten up these bolts because the load carried and the vibrations work them loose. The bolts heretofore employed have been made with a round stem and square head, and they have a prescribed limit of motion, which is reached when the flat surface of the head is brought against the part being clamped to place.

The object of my invention is to provide a bolt that cannot be revolved by the turning and straining of its clamping-nut, and which can be repeatedly tightened to take up looseness and wear, and which will at all times exert a lateral binding pressure against the rim or flange of the girder or other part to be held in position by the grip of the bolt-head.

With this object in view I construct my improved bolt in the following manner, viz: The diameter of the round stem is the same as the width or thickness of the head and a portion of the stem next the head; but these parts are made with flat parallel sides and right-angled corners and edges, and with a projecting head or claw, and with the edge next the head in line with the exterior of the stem, and the edge away from or opposite to the projecting head or claw at an inclination.

In the drawings, Figure 1 is a cross-section of part of an elevated-railroad structure with the bolts shown in elevation, and Fig. 2 is a cross-section of the bolt-stem and plan of the head.

A represents the angle-iron girders; B, the cross-tie, and C the guard-rail, and D the rail, which parts, being well known, do not require further description.

The bolt is composed of the round stem $a$, clamping-nut $b$, the flattened stem portion $a'$, the flattened head portion $c$, and the projecting head or claw $c'$, the stem and head portions being made in one piece of wrought metal.

The stem portion $a'$ and head portions $c$ and $c'$ are rectangular in cross-section, and have parallel sides 2 4 and right-angled edges 6 and 8 and corners 1, 3, 5, and 7, and the edge 6 is in line with the exterior of the round stem $a$, while the edge 8, between the points 9 and 11, is inclined outwardly, so as to cause one edge of the stem portion $a'$ and head portion $c$ to be wedge-shaped and in line with the head portions $c\ c'$. The lower surface of the head may be made in any shape desired.

The projecting head or claw $c'$ comes beneath the angle-iron girder A, and as the bolt is drawn up to place after being projected through the hole bored for it the inclined edge 8 presses against the wood and forces the edge 6 against the wood and edge of the girder, thus clamping the parts rigidly.

If any of the bolts loosen because of vibration or the consolidation of the structure, or otherwise, the tightening of the clamping-nut draws the rectangular-shaped stem portion $a'$ farther into the cross-tie, the corners 1, 3, 5, and 7 cutting a path, the inclined edge 8 acting to press the edge 6 against the wood and angle-iron A, and the turning of the nut cannot revolve the stem in the wood, because of the rectangular shape of the portion $a'$.

The practicability and consequent utility of my invention for the purposes of railroad construction will be apparent from the foregoing description.

I claim as my invention—

1. The bolt having a round stem, a hook-shaped head with flat sides, and a flat incline, 8, extending along the stem from the back of the head, so that the head is pressed against the article to be held as the bolt is forced into place, substantially as specified.

2. The bolt having a round stem, a sectionally-rectangular stem portion, a hook-shaped head with parallel flattened sides that continue along the stem portion, an edge, 6, and a flat inclined edge, 8, extending along the stem portion from the back of the head, substantially as and for the purposes set forth.

Dated March 30, 1887.

ABRAM J. HARDENBERGH.

Witnesses:
CHARLES T. POLHAMUS,
MYER MASTEN.